US010659332B2

(12) United States Patent
Andreescu (10) Patent No.: US 10,659,332 B2
(45) Date of Patent: May 19, 2020

(54) NETWORK NODE, A COMMUNICATION SYSTEM AND ASSOCIATED METHODS

(71) Applicant: Alexandru Bogdan Andreescu, Ploiesti (RO)

(72) Inventor: Alexandru Bogdan Andreescu, Ploiesti (RO)

(73) Assignee: NXP USA, Inc., Austin, TX (US)

( * ) Notice: Subject to any disclaimer, the term of this patent is extended or adjusted under 35 U.S.C. 154(b) by 532 days.

(21) Appl. No.: 14/606,424

(22) Filed: Jan. 27, 2015

(65) Prior Publication Data

US 2016/0149781 A1 May 26, 2016

(30) Foreign Application Priority Data

Nov. 26, 2014 (RO) .................................. 201400915

(51) Int. Cl.
*H04W 24/00* (2009.01)
*H04L 12/26* (2006.01)
*H04L 12/24* (2006.01)

(52) U.S. Cl.
CPC ........ *H04L 43/0829* (2013.01); *H04L 41/142* (2013.01)

(58) Field of Classification Search
CPC .... H04W 24/00; H04L 43/50; H04L 43/0852; H04L 43/08; H04B 17/003
See application file for complete search history.

(56) References Cited

U.S. PATENT DOCUMENTS

| 7,676,570 B2* | 3/2010 | Levy .................. H04L 43/0852 709/224 |
| 8,254,290 B2 | 8/2012 | Kim et al. |
| 8,345,660 B2 | 1/2013 | Filoso et al. |
| 8,787,460 B1* | 7/2014 | Hobbs .................... H04N 19/00 375/240.16 |
| 8,805,362 B2* | 8/2014 | Amirijoo .......... H04W 74/0866 370/252 |
| 9,137,816 B2* | 9/2015 | Hirsch .............. H04W 72/1215 |
| 2003/0031185 A1* | 2/2003 | Kikuchi .............. H04L 43/0852 370/400 |
| 2004/0024495 A1* | 2/2004 | Sunderland ............. F25B 49/02 700/299 |
| 2004/0044715 A1* | 3/2004 | Aldroubi ................ G06T 5/001 708/490 |

(Continued)

*Primary Examiner* — Hassan A Phillips
*Assistant Examiner* — Prenell P Jones (57) ABSTRACT

A first network node for communicating with a second network node over a first communication network is described. The second network node is arranged to communicate over the first communication network in a first part of a communication period and arranged to not communicate over the first communication network in a second part of the communication period. The first network node has a send unit for sending data formatted in data packets to the second network node, a statistics unit arranged for determining a success statistics, an availability estimator for deriving an availability estimation from the success statistics, and a send controller arranged to control the send unit in dependence on the availability estimation. Also described is a communication system, a method of estimating availability of a second network node, a method of communicating by a first network node, and an associated computer program product.

9 Claims, 7 Drawing Sheets

(56) References Cited

U.S. PATENT DOCUMENTS

| | | | | |
|---|---|---|---|---|
| 2004/0083195 A1* | 4/2004 | McCord | H04M 3/5233 | 706/47 |
| 2004/0264592 A1* | 12/2004 | Sibecas | H01Q 21/24 | 375/267 |
| 2005/0132062 A1* | 6/2005 | Halme | H04L 45/04 | 709/227 |
| 2006/0056370 A1* | 3/2006 | Hancock | H04B 7/2606 | 370/338 |
| 2007/0058656 A1* | 3/2007 | Breslow | H04B 7/18584 | 370/437 |
| 2008/0126158 A1* | 5/2008 | Notea | G06F 11/3447 | 705/7.22 |
| 2008/0253327 A1* | 10/2008 | Kohvakka | H04W 16/14 | 370/330 |
| 2010/0087205 A1* | 4/2010 | Kong | H04W 64/00 | 455/456.1 |
| 2011/0165874 A1* | 7/2011 | Amirijoo | H04W 74/0866 | 455/434 |
| 2011/0177825 A1* | 7/2011 | Huang | G01S 5/02 | 455/456.1 |
| 2012/0177025 A1* | 7/2012 | Huang | G01S 5/0236 | 370/342 |
| 2013/0021968 A1* | 1/2013 | Reznik | H04L 45/245 | 370/328 |
| 2013/0058316 A1* | 3/2013 | Hirsch | H04W 72/1215 | 370/336 |
| 2013/0077554 A1* | 3/2013 | Gauvreau | H04L 5/001 | 370/312 |
| 2013/0223481 A1* | 8/2013 | Flammer, III | H04B 1/713 | 375/136 |
| 2013/0346987 A1* | 12/2013 | Raney | G06F 9/5044 | 718/102 |
| 2014/0149121 A1* | 5/2014 | Di Fabbrizio | G10L 21/00 | 704/270.1 |
| 2014/0365683 A1* | 12/2014 | Bergman | H04L 45/34 | 709/238 |
| 2016/0128130 A1* | 5/2016 | Sadek | H04W 76/048 | 370/328 |
| 2017/0078922 A1* | 3/2017 | Raleigh | H04W 28/10 | |
| 2018/0159746 A1* | 6/2018 | Li | H04L 41/5016 | |

* cited by examiner

NETWORK NODE, A COMMUNICATION SYSTEM AND ASSOCIATED METHODS

CROSS REFERENCE TO RELATED APPLICATION(S)

The present application claims priority to Romanian Patent Application No. RO A 2014 00915, entitled "A NETWORK NODE, A COMMUNICATION SYSTEM AND ASSOCIATED METHODS," filed on Nov. 26, 2014, the entirety of which is herein incorporated by reference.

FIELD OF THE INVENTION

This invention relates to a first network node for communicating with a second network node over a first communication network, a communication system, a method for use by a first network node in a first communication network of estimating availability of a second network node for receiving data, a method of communicating by a first network node to a second network node over a first communication network, a computer program product and a non-transitory tangible computer readable storage medium.

BACKGROUND OF THE INVENTION

Some communication systems employ one or more network nodes that are only available for communication over a specific network during a part of a communication period. Such network nodes thus switch between an active part of the communication period wherein the network node is active to communicate over the specific network and an inactive period of the communication period wherein the network node is not available for communication over the specific network. For example, a low-power network node may be active with a duty cycle of the communication period such that the network node can be switched between a full power, full functional communication mode during the active part of the duty cycle and a low power mode during the inactive part. When another node wants to send data to such low-power network node over the specific network, the other node may find that data is not always received by the low-power network node, and the other node may be required to resend the data until the other node sends the data while the low-power network node is in the active part of the communication period. As another example, a multiple-network node, such as a dual-network node, may be available during a first part of a communication period to communicate exclusively over a first specific network, and during a second part of the communication period to communicate exclusively over a second specific network. Also in this other example, data send by another node over the first specific network can only be received while the multiple-network node is active and data needs to be resend of the multiple-network node is not available to communicate over the first specific network.

Methods are known wherein network nodes try to send data and resend data if it is detected that the data is not received. This results in many retries and a high over-the-air traffic including many failed transmissions. Other prior art methods are known to synchronize networks using special control packets, referred to as beacon packets. As an example of such prior art methods, U.S. Pat. No. 8,254,290 B2 describes a method and apparatus for using a synchronous sensor network medium access control (MAC) protocol such as a ZigBee or IEEE 802.15.4 low-rate wireless personal area network (WPAN). The beacon packets are sent periodically and result in itself in additional over-the-air traffic compared on top of the over-the-air traffic of the data packets. Further, the additional over-the-air traffic may lead to more retries when trying to send data over the network, as retries may be needed when the network is not clear. Also, exchanging these additional beacon packets may decrease the battery life of the nodes.

SUMMARY OF THE INVENTION

The present invention provides a first network node for communicating with a second network node over a first communication network, a communication system, a method for use by a first network node in a first communication network of estimating availability of a second network node for receiving data, a method of communicating by a first network node to a second network node over a first communication network, a computer program product and a non-transitory tangible computer readable storage medium as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

FIG. 1b schematically illustrates some elements of communication in embodiments of the communication system shown in FIG. 1a;

FIG. 2b schematically illustrates some elements of communication in embodiments of the communication system shown in FIG. 2a;

DETAILED DESCRIPTION OF THE PREFERRED EMBODIMENTS

Figure 1A:
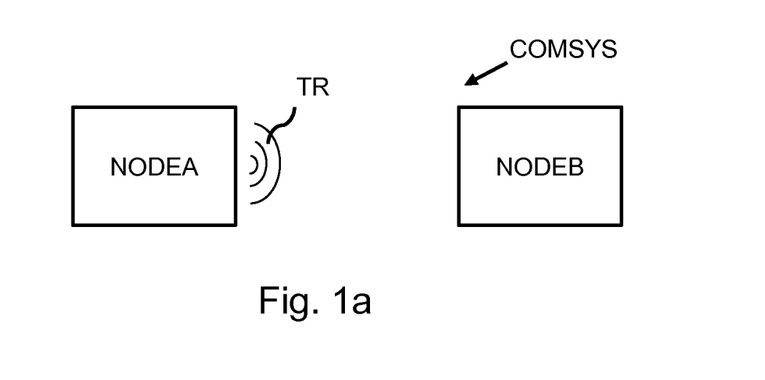
FIG. 1a schematically shows an example of an embodiment of a communication system.

FIG. 1a schematically shows an example of an embodiment of a communication system COMSYS. The communication system COMSYS comprises a first network node NODEA and a second network node NODEB. The first network node NODEA is arranged to transmit over a first communication network using a transmission signal TR. The transmission signal TR may be provided according to a communication protocol defined in a standard associated with the first communication network, such as e.g. systems based on a IEEE 802.15.4 standard like the ZigBee standard.

The first communication network may be a first Personal Area Network (PAN). The second network node NODEB is arranged to receive data over the first communication network during a first part of a communication period, but is not available to receive data over the first communication network during a second part of the communication period. In the description, the second network node NODEB will be described as a dual-network node arranged to communicate exclusively over the first communication network during a first part of a communication period and to communicate exclusively over the second communication network during a second part of a communication period, where the first and second part of the communication period together form the, complete, communication period. The second network node NODEB may however alternatively be a single-network node which is active with a duty cycle of the communication period; a dual-network node that is further arranged to be inactive on the first and second communication networks during a third part of the communication period, and wherein the first, second and third part of the communication period together form the, complete, communication period; or a multiple-network node arranged to sequentially communicate exclusively over each one of three of more communication networks.

The features and operation of the dual-network node as described below shall be considered non-limiting to the specific embodiment and, from its description, the person skilled in the art will understand the applicability to such alternative network nodes. As an example, the communication system may be (part of) a Home Automation network system, with the first communication network being a first PAN for communication between a temperature sensor as the first network node and a thermostat as the second network node and the second network being a second PAN for communication between the thermostat and a heat pump as a further network node. As another example, the communication system may be (part of) a wireless sensor network system of spatially distributed autonomous sensors to monitor physical or environmental conditions using sensor network nodes, such as sensors for monitoring temperature, sound, pressure, environmental parameters, occupancy, etc. and to cooperatively pass their data through multiple PANs to a main control system. As another example, the communication system may be (part of) a smart lighting network system of a plurality of spatially distributed lighting units as first network nodes and one or more lighting control units as second network node(s), using multiple communication networks for communication, e.g., multiple ZigBee-type PANs.

Figure 1B:
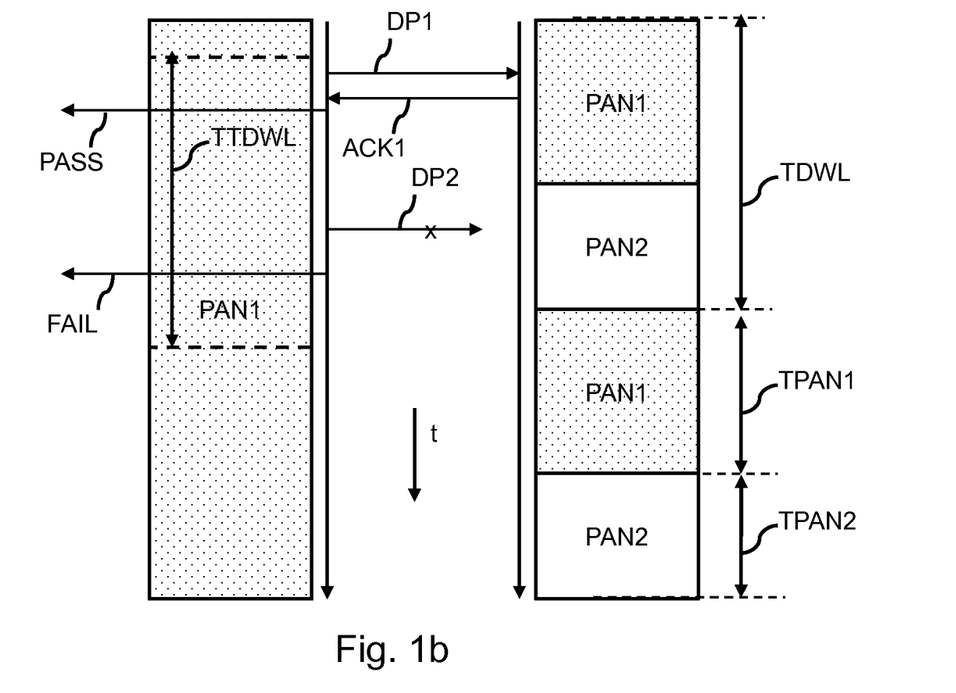

FIG. 1b schematically illustrates some elements of communication in embodiments of the communication system COMSYS shown in FIG. 1a, its components and its operation. FIG. 1b shows a non-limiting example where the first communication network is indicated as a first Personal Area Network PAN1, in this example as a first ZigBee network. The first network node NODEA may be continuously available on the first Personal Area Network PAN1, as indicated with the dot-filled box on the left side of FIG. 1b. The second network node NODEB is shown as a dual-network node switching its availability between the first Personal Area Network PAN1 during a first part of a communication period TDWL and a second Personal Area Network PAN2 during a second part of the communication period TDWL, as indicated with the dot-filled box and open box on the right side of FIG. 1b. The length of the communication period TDWL may be pre-determined and fixed and known to the first network node NODEA, e.g., by configuration parameters programmed into the first network node NODEA, by configuration information obtained by the first network node NODEA from the second network node NODEB, or determined by the first network node in a similar manner as described below, e.g. with reference to FIG. 4-FIG. 8. The length of the communication period TDWL may be referred to as 'total dwell time'. The length of the first part of the communication period TDWL, during which the second network node is available for communication over the first network, may be referred to as 'first dwell time' TPAN1 or 'dwell time on PAN1' TPAN1. The length of the second part of the communication period TDWL, during which the second network node is available for communication over the second network, may be referred to as 'second dwell time' TPAN2 or 'dwell time on PAN2' TPAN2.

FIG. 1b schematically shows a sending of a first data packet DP1 from the first network node NODEA to the second network node NODEB over the first communication network. The second network node NODEB is shown to be available for communication over the first network when the first data packet DP1 is received, and send a first acknowledge message ACK1 after receipt of the first data packet DP1. The first network node NODEA receives the first acknowledge message ACK1 and determines the transmission to be successful, indicated as PASS. FIG. 1b schematically shows a sending of a second packet DP2 from the first network node NODEA to the second network node NODEB over the first communication network on a later moment. As however the second network node NODEB is not available for communication over the second network when the second data packet DP2 is transmitted, no second acknowledge message is send by the second network node NODEB. As the first network node NODEA does not receive any second acknowledge message within a timeout period from sending the second data packet, the first network node NODEA determines the transmission to be unsuccessful or failed, indicated as FAIL.

Figure 2A:
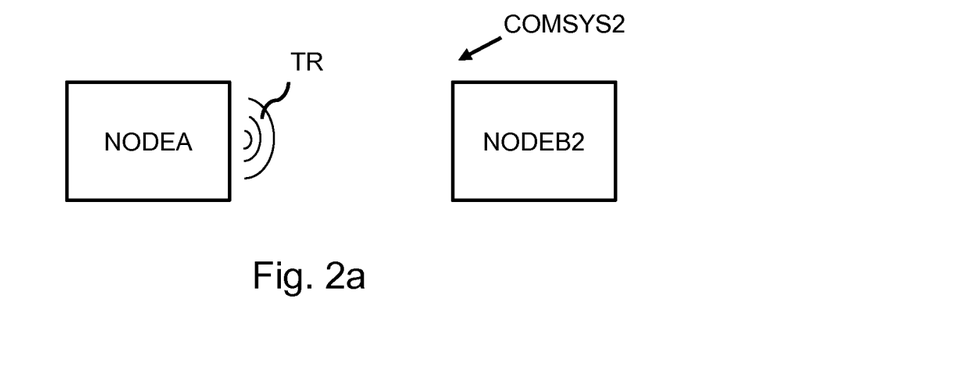
FIG. 2a schematically shows an example of an alternative embodiment of a communication system.
Figure 2B:
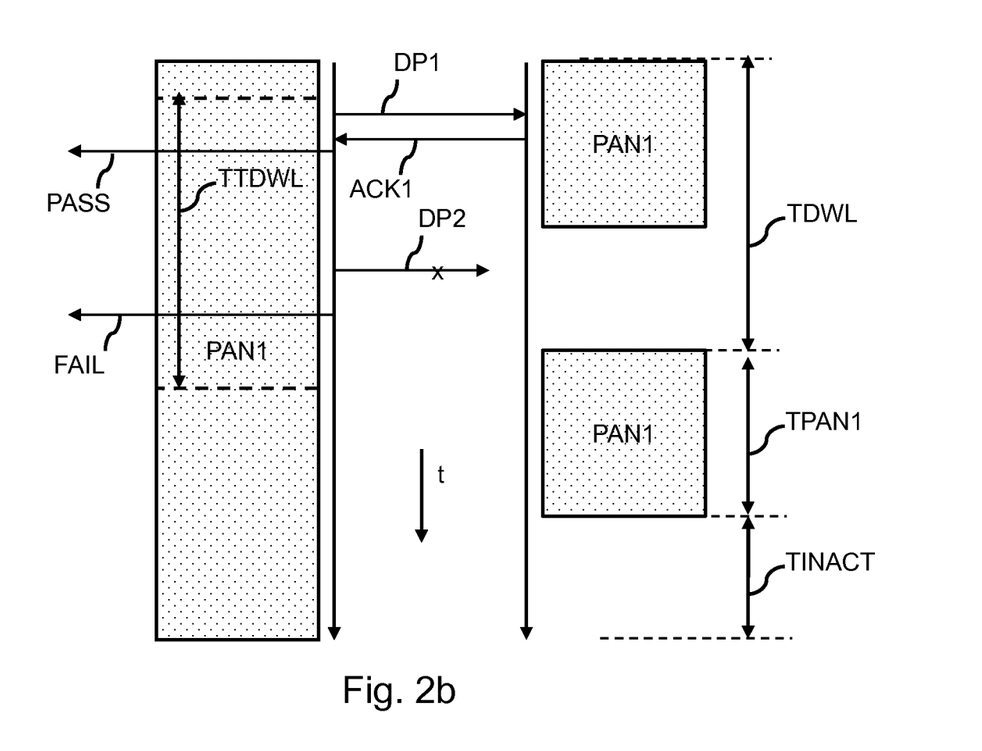

FIG. 2a schematically shows an example of an alternative embodiment of a communication system COMSYS2. The communication system COMSYS2 comprises a first network node NODEA and an alternative second network node NODEB2. FIG. 2b schematically illustrates some elements of communication in embodiments of the communication system COMSYS2 shown in FIG. 2a, its components and its operation. The communication system COMSYS2 differs from the communication system COMSYS1 in that the alternative second network node NODEB2 is a single-network node which is active with a duty cycle of the communication period: the alternative second network node NODEB2 is arranged to be available for communication over the first communication network PAN1 during a first part of the communication period TWDL at a duty cycle equal to TPAN1/TDWL, and the alternative second network node NODEB2 is inactive during a second part TINACT. The first network node NODEA may be the same first network node as described with reference to FIG. 1a and FIG. 1b, and reference is made to the description of FIG. 1b for describing the sending of a first data packet DP1 from the first network node NODEA to the alternative second network node NODEB2 over the first communication network. The person skilled in the art will understand the applicability of features and operation of the dual-network node in a communication system COMSYS as described below to embodiments of communication system COMSYS2 using a single-network node NODEB2.

Figure 3:
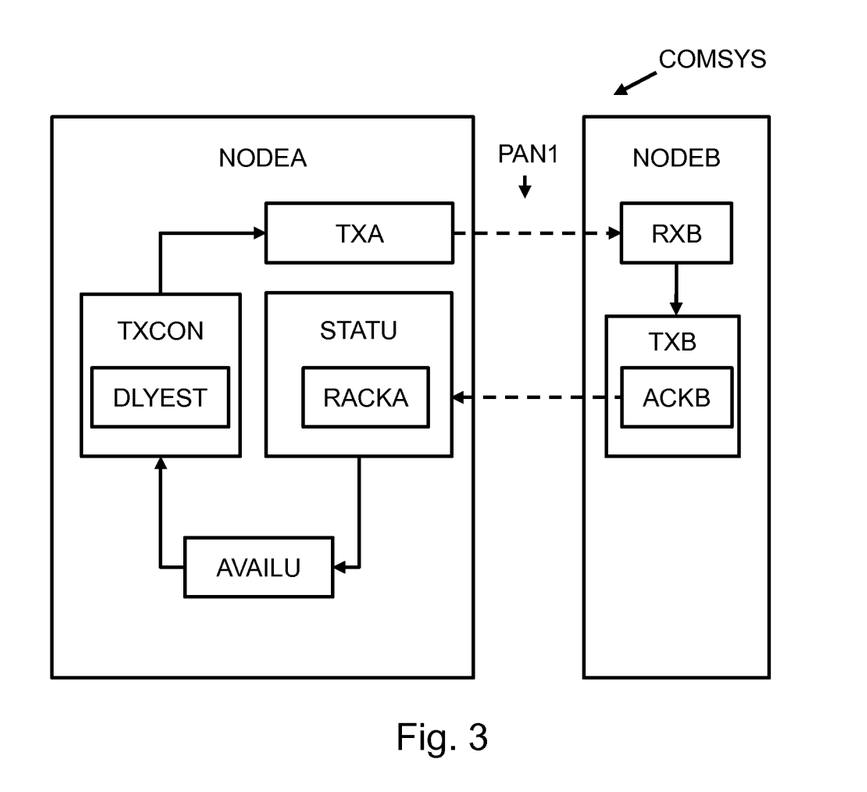
FIG. 3, FIG. 4, FIG. 5a, and FIG. 5b schematically illustrate an embodiment of a first network node and its operation.
Figure 4:
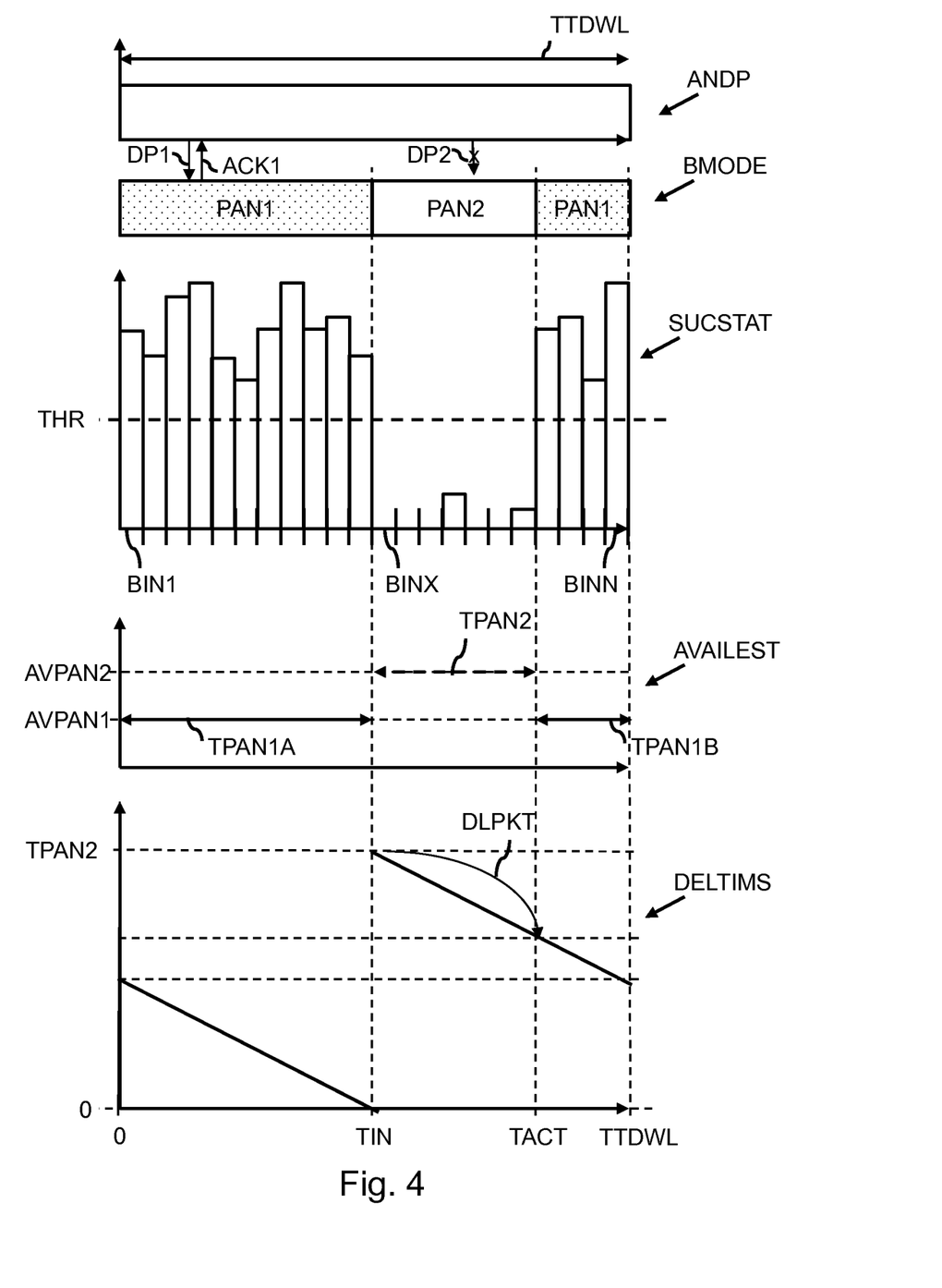

FIG. 3 and FIG. 4 schematically show an embodiment of a first network node NODEA for communicating with a second network node NODEB over a first communication network in an embodiment of a communication system COMSYS. The second network node NODEB is arranged to communicate over the first communication network PAN1 in a first part of a communication period and arranged to not communicate over the first communication network in a second part of the communication period. The first network node NODEA comprises a send unit TXA arranged for sending data formatted in data packets to the second network node NODEB over the first communication network. The first network node NODEA comprises a statistics unit STATU arranged for determining a success statistics SUCSTAT. The success statistics SUCSTAT indicates which amount of the data packets is received by the second network node NODEB as a function of time. The amount may correspond to a number of data packets received. The amount may correspond to a relative amount of data packets received. The first network node NODEA comprises an availability estimator AVAILU for deriving an availability estimation AVAILEST from the success statistics SUCSTAT. The availability estimation AVAILEST indicates when the second network node NODEB is available for receiving data over the first communication network. The statistics unit STATU and the availability estimator AVAILU thus cooperate to determine, or at least estimate, when the second network node NODEB is available for receiving data from the first network node from regular data packets, without using special synchronization messages such as special beacon frames and without the on-air-traffic associated with these special synchronization messages. The first network node NODEA further comprises a send controller TXCON arranged to control the send unit in dependence on the availability estimation. The send controller may hereby let the first network node NODEA to transmit the data packets over the first communication network when the second network node NODEB is available for receiving the data packets.

FIG. 3 schematically shows that the second network node NODEB has a communication unit comprising a receiver RXB and a transmitter TXB. The communication unit may also be referred to as a transceiver. The communication unit COMB is arranged to communicate over the first communication network PAN1 in a first part of a communication period TDWL and arranged to not communicate over the first communication network in a second part of the communication period TDWL. The communication unit COMB may be arranged to communicate exclusively over the first communication network PAN1 in the first part of the communication period TDWL. In the example shown, the second network node NODEB is further arranged to communicate over a second communication network in at least a part of the second part of the communication period and to not communicate over the second communication network in the first part of the communication period. Such second network node NODEB may be a dual-network device. The second network node NODEB may have a single transceiver periodically switching between being available for communication over the two, or more, communication networks it is connected to. In an embodiment, the first communication network uses a first physical channel and the second communication network uses a second physical channel, the second physical channel being different from the first physical channel. In an alternative embodiment, the first communication network and the second communication network use the same physical channel. An alternative example may use an alternative second network node NODEB2 is a duty-cycle operated network device comprising a communication unit of the second network node arranged to be inactive during the second part of the communication period.

The transmitter TXB of the second network node NODEB may comprise an acknowledger ACKB arranged to provide acknowledge messages from the second network node to the first network node over the first communication network in response of receipt of respective data packets by the receiver RXB of the second network node. The statistics unit STATU of the first network node may comprise an acknowledge receive unit RACKA arranged to receive acknowledge messages provided by the second network node NODEB to the first network node NODEA in response of receipt by the second network node of respective data packets. The statistics unit STATU may be arranged to determine the success statistics in dependence on statistics on timely arrival of the acknowledge messages. The statistics unit STATU may determine statistics as a function of time over a time period TTDWL having a length equal to the length of the communication period TDWL. The statistics unit STATU may hereto use a success buffer to store absolute numbers counting successful transmissions in a plurality of bins BIN1, . . . , BINN, and/or to store absolute numbers counting failed transmissions in a plurality of bins BIN1, . . . , BINN. The statistics unit STATU may alternatively use the success buffer to store success rates in a plurality of bins BIN1, . . . , BINN. The statistics unit STATU may e.g. determine success rate from the total number of data packets send during a time period corresponding to the respective bin, count the number of acknowledge messages received and/or count the number of failed transmissions from the number of timeouts. In another embodiment, the statistics unit STATU uses a subset of all data packets to determine the success statistics instead of the total number of data packets. The success statistics SUCSTAT may thus indicate which amount of the data packets is received by the second network node NODEB as a function of time as, for example, success rates stored per bin in the success buffer, by relating absolute numbers stored per bin in the success buffer relative to total number of data packets in all bins, or any other suitable manner.

The availability estimator AVAILU of the first network mode NODEA may be arranged to, in deriving the availability estimation AVAILEST, compare the success statistics SUCSTAT to a success threshold value THR. The availability estimator AVAILU may determine the availability estimation AVAILEST to indicate that the second network mode is available to communicate over the first communication network when the success rate at a certain time is larger than or equal to the success threshold value THR, and to indicate that the second network mode is not available to communicate over the first communication network when the success rate at a certain time is below the success threshold value THR. The success threshold value THR may be dynamically adjusted depending on the total number of data packets used for the statistics. The success threshold value THR may be defined as a function of time over the time period TTDWL. For example, the success threshold value THR may be bin-dependent. The bin-dependent threshold value THR may be dynamically adjusted in dependence on the number of data packets used for the statistics for each bin. A speed of dynamically adjusting the success threshold value THR may be dependent on a change speed of the success statistics SUCSTAT.

The send controller TXCON of the first network mode NODEA may comprise a delay estimator DLYEST. The delay estimator DLYEST may be arranged to determine delay times in dependence on the availability estimation AVAILEST. The send controller TXCON may be arranged to control the send unit TXA to delay the sending of data packets with the delay times. Hereby, delay times may be determined such that the data packets are provided with a delay such that the data packets are transmitted when the second network node NODEB is estimated to be available for receiving data from the first network node NODEA over the first communication network PAN1. The number of data packets transmitted while the second network node NODEB is not available may hereby be reduced.

FIG. 4 schematically shows an operation of the first network node NODEA of FIG. 3. FIG. 4 schematically shows a phase of the operation where the first network node NODEA and the second network node NODEB are not yet synchronized. At this phase, the first network node NODEA sends data packets distributed over a full time period TTDWL having a length equal to the length of the communication period TDWL that is used by the second network node NODEB, but, as also indicated in FIG. 1b, not yet synchronized with the communication period TDWL. The number of data packets send by the first network node NODEA as a function of time is indicated by upper graph ANDP. The second graph of FIG. 4 shows the availability of the second network node NODEB for communication over the first communication network PAN1, from T=0 to T=TIN and from T=TACT to T=TTDWL, and the second communication network PAN2, from T=TIN to T=TACT. Most data packets send by the first network node NODEA while the second network node NODEB is available for communication over the first communication network PAN1 are received and acknowledged by the second network node NODEB, as indicated for data packet DP1 and its acknowledge message ACK1. However, most data packets sent by the first network node NODEA while the second network node NODEB is not available for communication over the first communication network PAN1 but only for communication over the second communication network PAN2 are not received, as indicated for data packet DP2, and hence not acknowledged by the second network node NODEB. The third graph in FIG. 4 shows a success statistics SUCSTAT determined by the statistics unit STATU and indicating which amount of the data packets send by the first network node NODEA is received by the second network node NODEB as a function of time. In this example, the success statistics SUCSTAT uses a histogram with N bins BIN1, . . . , BINN of equal time duration spanning a time period TTDWL equal to the full length of the communication period TDWL used by the second network node NODEB. The statistics unit STATU also keeps a counter of number of data packets, such that the histogram and the counter of number of data packets provides an indication which amount of the data packets send by the first network node NODEA is received by the second network node NODEB as a function of time. In this example, each bin is used to count the number of successful transmissions. The histogram thus comprises high numbers in bins corresponding to time periods where the second network node NODEB is available for receiving data packets over the first communication network, such as in BIN1 and BINN, and low numbers in bins corresponding to time periods where the second network node NODEB is not available for receiving data packets over the first communication network, such as BINX. The availability estimator AVAILU of the first network mode NODEA may be arranged to compare the success statistics SUCSTAT to a success threshold value THR, indicated as a horizontal dashed line in the histogram, to derive the availability estimation AVAILEST. As shown, the availability estimation AVAILEST obtained from this comparison is at a first availability level indicated as AVPAN1 during a first time span TPAN1A and a further time span TPAN1B, which together have a length substantially equal to the dwell time on PAN1 of the second network node NODEB. the availability estimation AVAILEST obtained at a second availability level indicated as AVPAN2 during a second time span TPAN2, has a length substantially equal to the dwell time on PAN2 of the second network node NODEB. The availability estimation AVAILEST is used by the delay estimator DLYEST to determine delay times DELTIMS as a function of time, such that the first network node can continue to send data packets with respective delay times such that the data packets are transmitted while the second network node NODEB is available for communication over the first communication network PAN1. For example, data packets available for transmission at the start of dwell time on PAN2 are delayed with, for example, the second time span TPAN2 to be transmitted when the second network node is available for communication over the first network PAN1, as indicated with arrow DLPKT. Delay times are determined and used at least for data packets available for transmission by the first network node NODEA when the availability estimation AVAILEST indicates that the second network node NODEB is not available for communication over the first network PAN1. Delay times may be determined and used for data packets available for transmission by the first network node NODEA over the complete length TTDWL of the communication period. In an alternative embodiment, delay times may be determined and used for data packets available for transmission by the first network node NODEA only when the availability estimation AVAILEST indicates that the second network node NODEB is not available for communication over the first communication network PAN1.

Figure 5A:
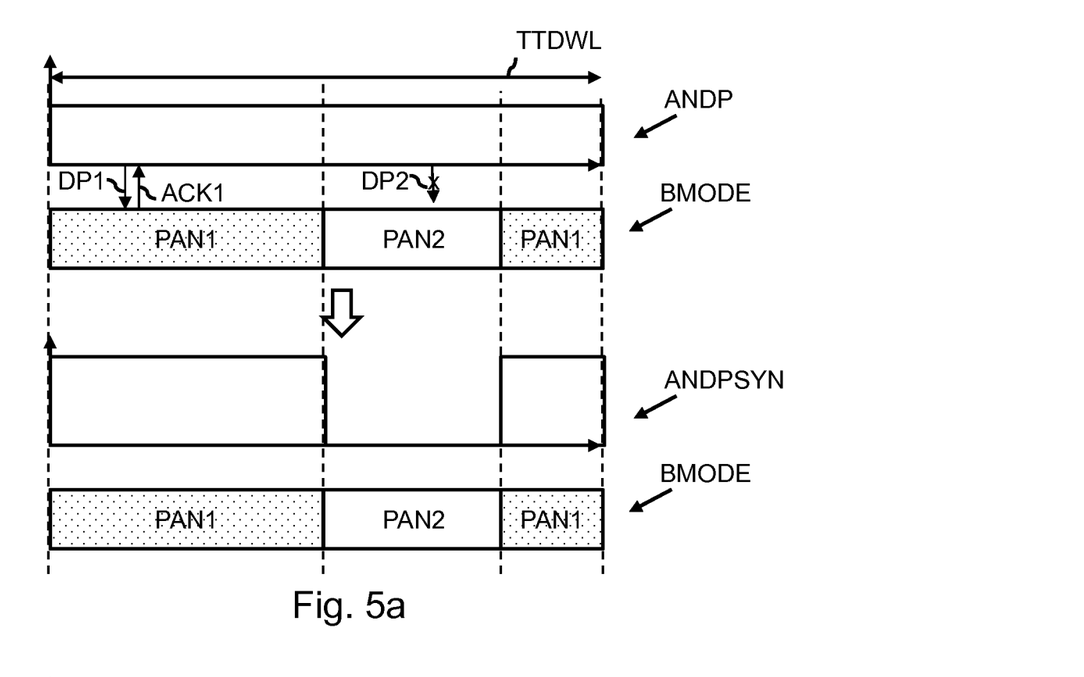

FIG. 5 schematically shows the effect of the operation described with reference to FIG. 4. The upper two graphs indicate a phase where the first and second network nodes are not yet synchronized, and correspond to the upper two graphs of FIG. 4. The upper graph ANDP indicates that the first network node NODEA transmits a constant rate of data packets distributed over a time period TTDWL with a length equal to the communication period. The second graph indicates whether the second network node NODEB is available for communication over the first communication network PAN1 or the second communication network PAN2. The lower two graphs indicate an exemplary situation resulting from the operation described with reference to FIG. 4: the first and second network nodes are synchronized. Now, the number of data packets send by the first network node NODEA as a function of time is indicated by upper graph ABDPSYN which shows that no data packets are transmitted while the second network node NODEB is not on the first communication network PAN1, but on the second communication network PAN2.

Figure 5B:
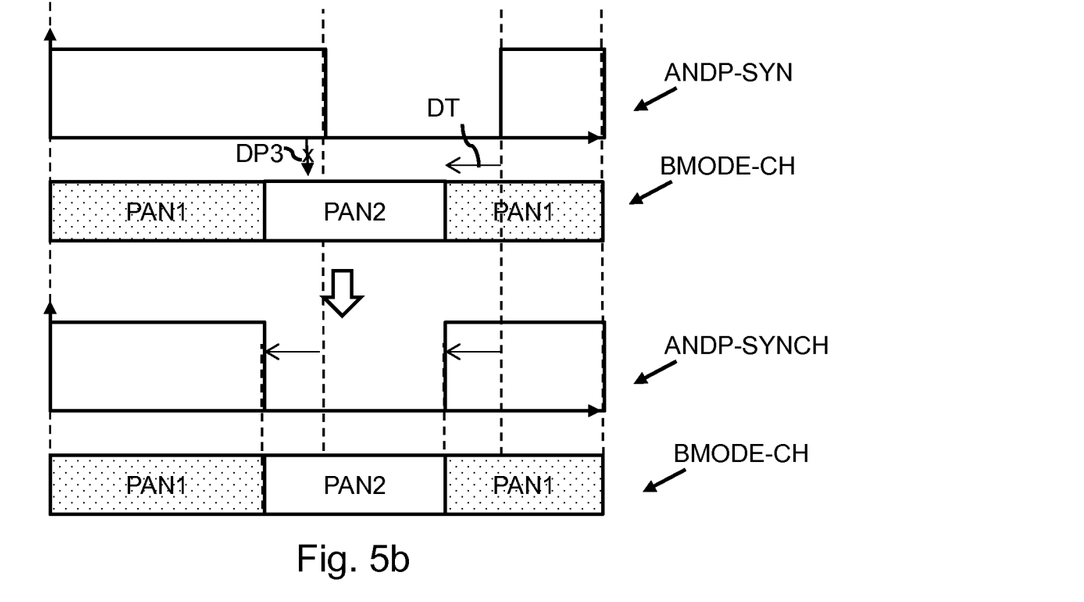

In some embodiments of a communication system, the second network node NODEB may use a total communication period TDWL of constant length, but with varying the dwell times on the different networks, e.g. to accommodate for varying network loads on the different networks. Also, in some embodiments, the second network node NODEB may use a total communication period TDWL of constant length, but with an adjustment to its phase, for example for synchronization with the second communication network or with other internal or external circuitry, such as a memory access controller. An example is shown schematically in FIG. 5b. The upper graph in FIG. 5b indicates the situation after synchronization between the first network node NODEA and the second network node NODEB for communication over the first communication network PAN1 as described with reference to FIG. 3 and FIG. 4. The second graph shows schematically that the second network node NODEB changed its dwell times on both networks. As a result, the first network node NODEA fails to successfully transmit some data packets, such as data packet DP3. This is reflected in the success statistics SUCSTAT, and the availability estimation AVAILEST is accordingly changed, whereby the delay times DELTIMS are adjusted to accommodate for the changed availability such that the sending is controlled to send data packets as a function of time as indicated by upper graph ANDP-SYNCH. The success statistics SUCSTAT is thus not only used for an initial synchronization at an initial phase of operation, but also to adjust the synchronization during further operation.

Figure 6:
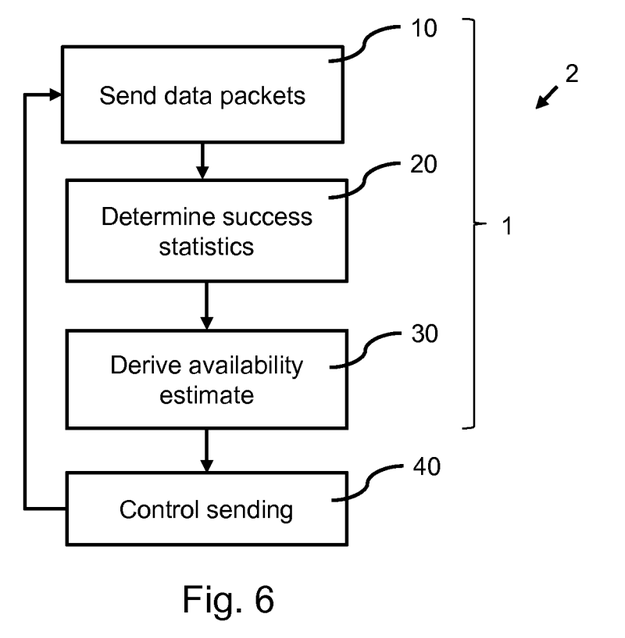
FIG. 6, FIG. 7 and FIG. 8 schematically illustrate embodiments of methods for use by a first network node and further embodiments thereof.

FIG. 6 schematically shows a method for use by a first network node in a first communication network of estimating availability of a second network node, and a method of communicating by a first network node to a second network node over a first communication network.

FIG. 6 schematically shows a method 1 for use by a first network node NODEA in a first communication network PAN1 of estimating availability of a second network node NODEB for receiving data over the first communication network PAN1, the second network node NODEB being arranged to communicate over the first communication network PAN1 in a first part of a communication period TDWL and arranged to not communicate over the first communication network PAN1 in a second part of the communication period. The method 1 comprises sending 10 data formatted in data packets from the first network node NODEA over the first communication network PAN1 to the second network node NODEB. The method 1 comprises, by the first network node, determining 20 a success statistics SUCSTAT, the success statistics indicating which amount of the data packets is received by the second network node NODEB as a function of time. The method 1 comprises, by the first network node, deriving 30 an availability estimation AVAILEST from the success statistics, the availability estimation indicating when the second network node is available for receiving data from the first network node over the first communication network.

Figure 7:
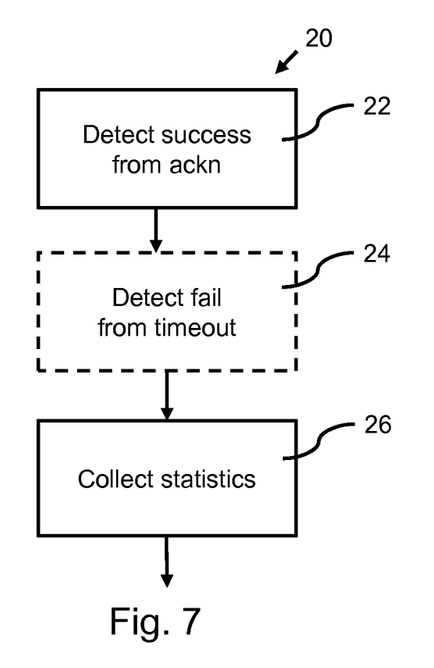

Determining 20 a success statistics SUCSTAT may further comprise, by the first network node, receiving acknowledge messages provided by the second network node to the first network node in response of receipt by the second network node of respective data packets. The determining the success statistics may be performed in dependence on statistics on timely arrival of the acknowledge messages. As indicated in FIG. 7, determining 20 a success statistics SUCSTAT may comprise detecting 22, by the first network node, a successful receipt of a data packet by the second network node from a timely arrival of an associated acknowledge message. As indicated in FIG. 7, determining 20 a success statistics SUCSTAT may further comprise detecting 24, by the first network node, a failure of receipt of a data packet by the second network node from a timeout on receiving an associated acknowledge message. As indicated in FIG. 7, determining 20 a success statistics SUCSTAT may comprise collecting 26 statistics on successful and/or failed receipt as detected from the timely arrival and/or timeouts on arrival of acknowledge messages. Determining 20 a success statistics SUCSTAT may comprise collecting success rates during sub-periods of the communication period in a buffer to determine the success statistics as a function of time during at least the communication period. The buffer may be a cyclic buffer. The buffer may comprise a filter at its input, such as a FIR or an IIR filter, to store filtered success rates.

Deriving 30 an availability estimation AVAILEST from the success statistics may comprise comparing the success statistics to a success threshold value to derive the availability estimation.

FIG. 6 schematically shows a method 2 communicating by a first network node to a second network node over a first communication network. The method 2 comprises, by the first network node, obtaining an availability estimation from using an embodiment of the method 1 of estimating availability of the second network node for receiving data over the first communication network as described above. The method 2 further comprises, by the first network node, controlling 40 the sending of data formatted as data packets over the first communication network by the first network node in dependence on the availability estimation.

Figure 8:
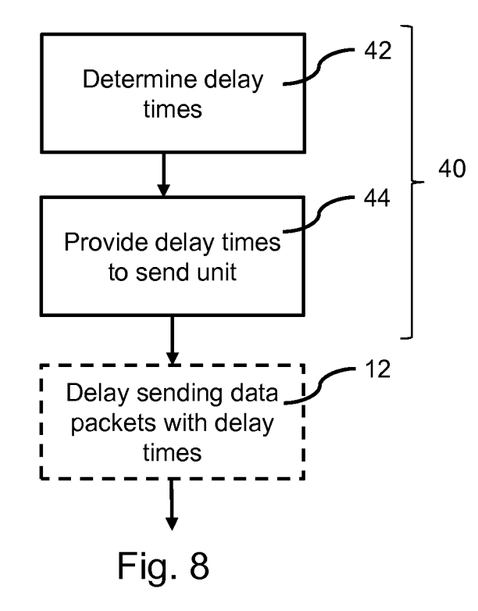

FIG. 8 shows an embodiment of controlling 40 the sending of data formatted as data packets over the first communication network by the first network node in dependence on the availability estimation. In the embodiment of FIG. 8, controlling 40 comprises determining 42 delay times in dependence on the availability estimation and providing 44 the delay times to the send unit. The send unit is hereby controlled to delay 12 the sending of data packets with the delay times. Thus, the controlling the sending of data packets is associated with delaying the sending of data packets with the delay times. Hereby, the sending by the first network node is synchronized with the period of availability for receiving packets by the second network node.

The first network node NODEA may be, comprise or be part of a programmable apparatus having a programmable processor. The programmable processor is arranged to at least perform any one of the methods according to the invention. The programmable processor may be capable to read, a computer readable medium comprising a program code. The programmable processor may be capable to read, using a data I/O device, a computer readable medium comprising a computer program product comprising instructions for causing the programmable apparatus perform a method 1 of estimating availability of a second network node NODEB for receiving data over the first communication network PAN1 as described above, or a method 2 communicating by a first network node to a second network node over a first communication network as described above. The computer program product may comprise a set of instructions using an IEEE 802.15.4 MAC layer implementation to retrieve information as to whether a transmission was successful or not. The computer program product may comprise another set of instructions using a ZigBee NWK layer for triggering the sending of data packets.

Figure 9:
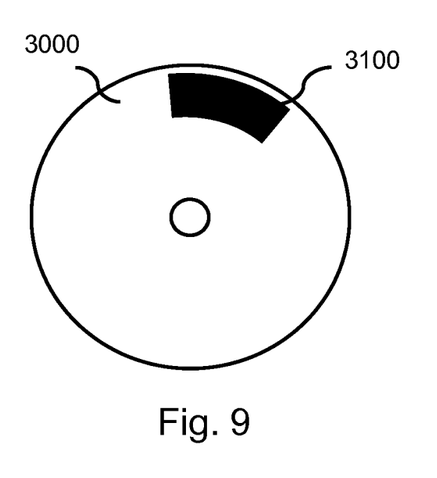
FIG. 9 shows a computer readable medium comprising a computer program product.

FIG. 9 shows a computer readable medium 3000 comprising a computer program product 3100, the computer program product 3100 comprising instructions for causing a programmable apparatus to perform a method of estimating availability of a second network node for receiving data from a first network node over a first communication network according to any one embodiment described above. The computer program product 3100 may further comprise instructions for causing the programmable apparatus to cause a programmable apparatus to perform a method of communicating by a first network node to a second network node over a first communication network according to any one embodiment described above. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 9 as an optical disc, the computer readable medium 3000 may be any suitable computer readable medium, such as a hard disk, solid state memory, flash memory, etc., and may be non-recordable or recordable. The computer readable medium may be a non-transitory tangible computer readable storage medium. The computer readable medium may be a non-transitory tangible computer readable storage medium comprising data loadable in a programmable apparatus, the data representing instructions executable by the programmable apparatus, said instructions comprising one or more send instructions for sending data formatted in data packets from a first network node over a communication network to a second network node, the second network node being arranged to communicate over the first communication network in a first part of a communication period and arranged to not communicate over the first communication network in a second part of the communication period; one or more statistics instructions for determining a success statistics, the success statistics indicating which fraction of the data is received as a function of time; one or more availability estimation instructions for deriving an availability estimation from the success statistics, the availability estimation indicating when the second network node is available for receiving data from the first network node over the first communication network; and one or more control instructions for controlling the sending in dependence in the availability estimation.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details have not been explained in any greater extent than that considered necessary, for the understanding and appreciation of the underlying concepts of the present invention and in order not to obfuscate or distract from the teachings of the present invention.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Furthermore, although FIG. 3 and the discussion thereof describe an exemplary architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Also, the units and circuits may be suitably combined in one or more semiconductor devices. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for use by a first network node in a first communication network of estimating availability of a second network node for receiving data over the first communication network, the second network node being arranged to communicate over the first communication network in a first part of a communication period and arranged to not communicate over the first communication network in a second part of the communication period, the method comprising:
    sending data formatted in data packets from the first network node over the first communication network to the second network node,
    determining a success statistics, the success statistics indicating which amount of the data packets is received as a function of time over a period of time, wherein the period of time is equal to the communication period,
    deriving an availability estimation from the success statistics, the availability estimation indicating when the second network node is available for receiving data over the first communication network.

2. A method according to claim 1, further comprising receiving acknowledge messages provided by the second network node to the first network node in response of receipt by the second network node of respective data packets, and, the determining the success statistics being performed in dependence on statistics on timely arrival of the acknowledge messages.

3. A method according to claim 1, comprising collecting success rates during sub-periods of the communication period in a buffer to determine the success statistics as a function of time during at least the communication period.

4. A method according to claim 1, comprising comparing the success statistics to a success threshold value to derive the availability estimation.

5. A method of communicating by a first network node to a second network node over a first communication network, the method comprising:
    obtaining an availability estimation from using a method of estimating availability of the second network node for receiving data over the first communication network according to claim 1, and
    controlling the sending of data formatted as data packets over the first communication network by the first network node in dependence on the availability estimation.

6. A method of communicating according to claim 5, comprising determining delay times in dependence on the availability estimation, the controlling the sending of data packets being associated with delaying the sending of data packets with the delay times.

7. A method of communicating according to claim 5, the first communication network being a personal area network.

8. A non-transitory tangible computer program product comprising instructions for causing a programmable apparatus to perform a method of estimating availability of a second network node for receiving data from a first network node over a first communication network as claimed in claim 1.

9. A non-transitory tangible computer readable storage medium comprising data loadable in a programmable apparatus, the data representing instructions executable by the programmable apparatus, said instructions comprising:
    one or more send instructions for sending data formatted in data packets from a first network node over a communication network to a second network node, the second network node being arranged to communicate over the first communication network in a first part of a communication period and arranged to not communicate over the first communication network in a second part of the communication period
    one or more statistics instructions for determining a success statistics, the success statistics indicating which fraction of the data is received as a function of time over a period of time, wherein the period of time is equal to the communication period,
    one or more availability estimation instructions for deriving an availability estimation from the success statistics, the availability estimation indicating when the second network node is available for receiving data from the first network node over the first communication network, and
    one or more control instructions for controlling the sending in dependence in the availability estimation.

* * * * *